United States Patent [19]

Tanguy

[11] Patent Number: 4,499,922

[45] Date of Patent: Feb. 19, 1985

[54] ROTARY DISTRIBUTOR FOR A HYDRAULIC SERVO-MECHANISM

[75] Inventor: Christian Tanguy, Frepillon, France

[73] Assignee: Societe Anonyme D.B.A., Paris, France

[21] Appl. No.: 453,015

[22] Filed: Dec. 27, 1982

[30] Foreign Application Priority Data

Jun. 1, 1982 [FR] France .................................. 82 00090

[51] Int. Cl.³ .............................................. B26D 5/06
[52] U.S. Cl. ............................. 137/625.24; 91/375 A; 91/375 R
[58] Field of Search ...................... 137/625.21, 625.22, 137/625.23, 625.24; 91/375 A, 375 R

[56] References Cited

U.S. PATENT DOCUMENTS

| 3,145,626 | 8/1964 | Vickers | ............................. 91/375 A |
| 3,296,940 | 1/1967 | Eddy | ......................... 137/625.24 X |

FOREIGN PATENT DOCUMENTS 879476  8/1971  Canada ........................... 137/625.24

Primary Examiner—Alan Cohan
Attorney, Agent, or Firm—Larry J. Palguta; Ken C. Decker

[57] ABSTRACT

A distributor of a hydraulic servo-mechanism is provided for power-assisted steering. According to the invention, the fluid circulation circuit defined by the interaction of two distributor elements (11, 13) consists of longitudinal grooves (40a, 40b) in the outer distributor element (11) and of holes (44, 45), some of which are blind, arranged radially in the inner distributor element (13). The holes have different diameters.

7 Claims, 6 Drawing Figures

FIG_1

FIG_2

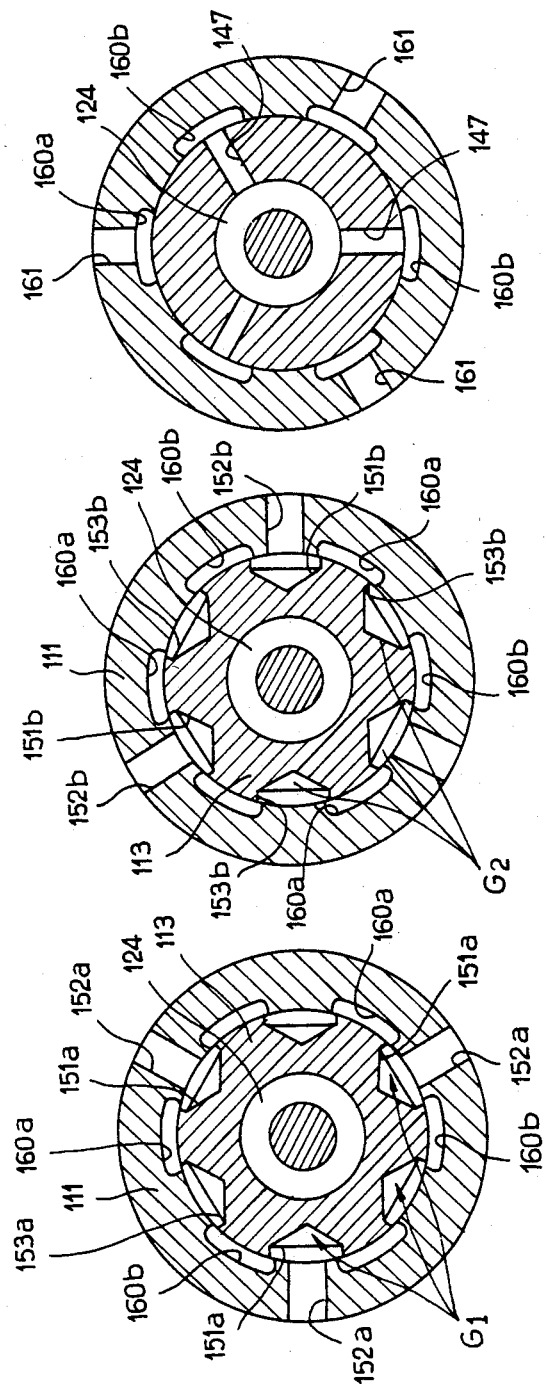

ROTARY DISTRIBUTOR FOR A HYDRAULIC SERVO-MECHANISM

The invention concerns a rotary distributor for a hydraulic servo-mechanism and in particular a novel arrangement of the openings and cavities employed in the distributor to define the distribution circuits.

Different types of rotary distributor for hydraulic servo-mechanisms are known, designed principally to form part of a motor vehicle servo-steering system. Such distributors consist essentially of two distributor elements each comprising tubular, cylindrical and co-axial parts rotatably mounted in a stationary casing. The outer distributor element or stator is provided with an axial bore which serves as a bearing for the inner distributor element or rotor. These distributor elements are provided with openings and cavities which define a fluid circulation circuit intended to be connected, on the one hand, between a fluid source and a fluid reservoir, and on the other hand, to at least one chamber of an assistance cylinder mechanically coupled to the steering gear for the vehicle wheels. The afore-mentioned cavities and openings consist of passages of variable section arranged in the cylindrical contact surfaces of the distributor elements. The most conventional distributor of this type is provided with a series of longitudinal grooves spaced evenly on the outer surface of the inner distributor element and with longitudinal grooves spaced evenly on the inner surface of the outer distributor element. These longitudinal grooves are staggered so that their edges interact to define the variable section passages mentioned above, the section of these passages varying as a function of the limited rotation of one distributor element relative to the other, to and fro about a relative neutral position which is generally defined by the rest position of a torsion bar whose ends are connected to said outer and inner distributor elements, respectively. More recently a distributor has been proposed in which the longitudinal grooves of the outer distributor element have been replaced by diametrical blind drillings arranged at regular intervals, so that each drilling forms in the outer distributor element both a transversing orifice and also an opposite blind cavity, facing respectively smooth bearing outer areas of the inner distributor between the adjacent edges of two neighboring grooves thereof, when in said neutral position. This arrangement of the distributor circuit has been shown to give complete satisfaction from the point of view of the operation of the servo-mechanism itself, but the fabrication of the afore-mentioned diametral blind drillings has been shown to be a delicate operation owing to the poor guidance of the drill at the moment when it starts to form the afore-mentioned blind cavity in the inner surface of the outer distributor element.

The invention proposes a novel arrangement of the distribution circuit offering equivalent functional characteristics but for which the manufacturing problems mentioned above are no longer present.

The basic notion of the invention consists in transferring the blind holes to the outer surface of the rotor or inner distributor element, where they are much easier to fabricate with the required accuracy of position.

With this aim in mind, the invention is thus principally concerned with a rotary distributor of hydraulic fluid for a servo-mechanism, more particularly for a power-assisted steering system of an automotive vehicle, of the type comprising two distributor elements provided with co-axial cylindrical portions, namely an outer distributor element and an inner distributor element rotatably mounted in an axial bore of said outer distributor element, and capable of a limited relative rotation with respect to the latter, to and fro about a relative neutral position, wherein said distributor elements are provided with openings and cavities which define a fluid circulation circuit and which may be connected to a fluid source and a fluid reservoir, on the one hand, and also to at least one chamber of an assistance cylinder on the other hand, said circuit including passages of variable section defined by the cylindrical contact surfaces of said distributor elements, characterized in that said passages of variable section consist of:

an even number of longitudinal grooves closed at their axial ends, which are known per se, angularly spaced evenly around the inner surface of the outer distributor element; and holes formed radially at regular intervals in the inner distributor element and positioned facing smooth inner areas of said outer distributor element between the adjacent edges of two neighbouring grooves thereof, when in said neutral position. At least some of said holes are blind so as to form the cavities mentioned above which allow communication between two adjacent grooves of the outer distributor element.

Starting from this basic construction, several embodiments are possible according to whether the pump and the reservoir are made to communicate with the grooves in the outer distributor element or with the holes in the inner distributor element.

The invention will be better understood and its other advantages will appear more clearly in the light of the description which follows of two embodiments of a distributor in conformance to the invention, given only by way of example and referring to the accompanying drawings in which:

FIG. 4 is a section IV—IV of the distributor elements of the device in FIG. 3;

FIG. 5 is a section V—V of the distributor elements of the device in FIG. 3;

FIG. 6 is a section VI—VI of the distributor elements in FIG. 3.

Figure 1:
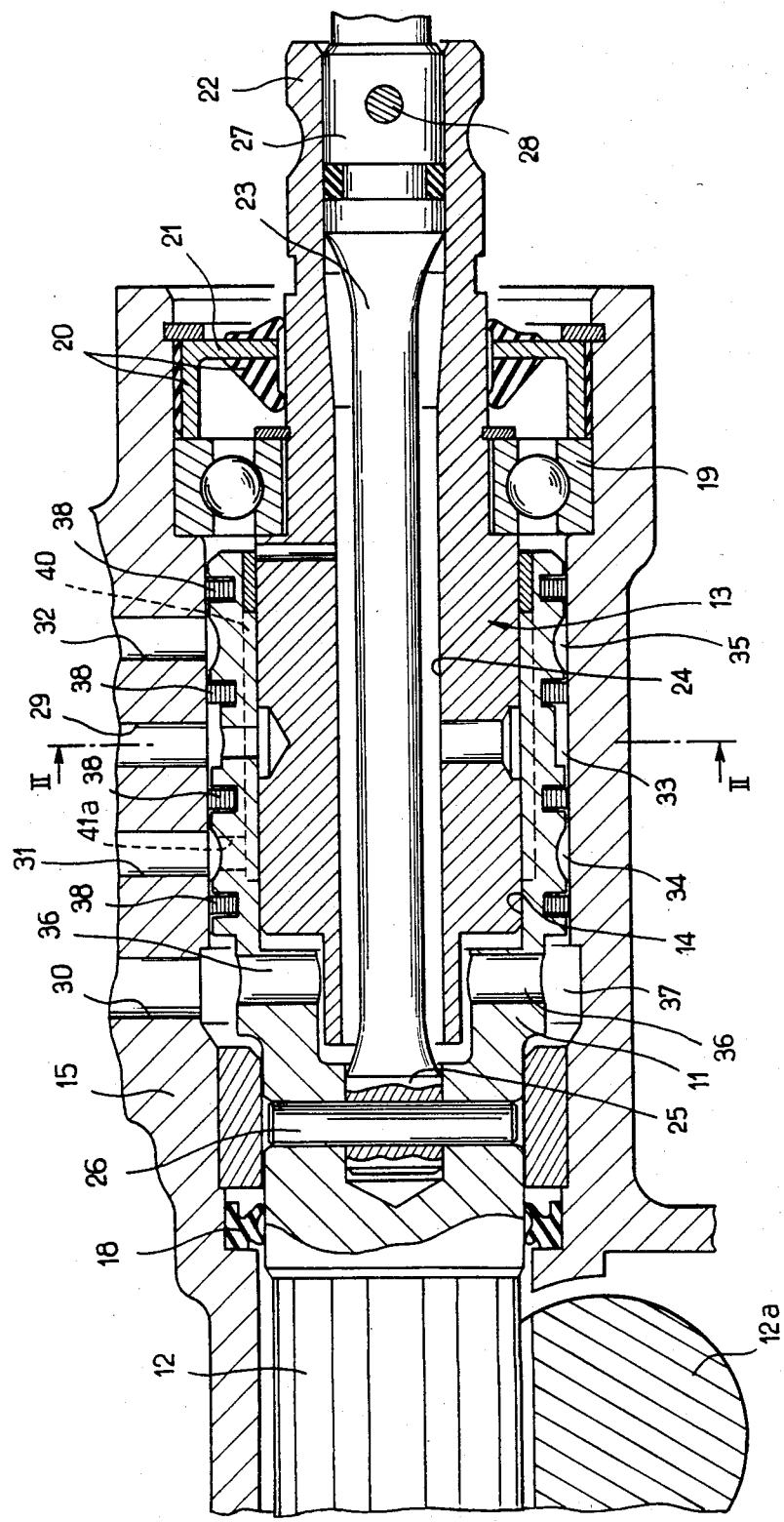
FIG. 1 is a partial sectional view of a distributor conforming to the invention.
Figure 2:
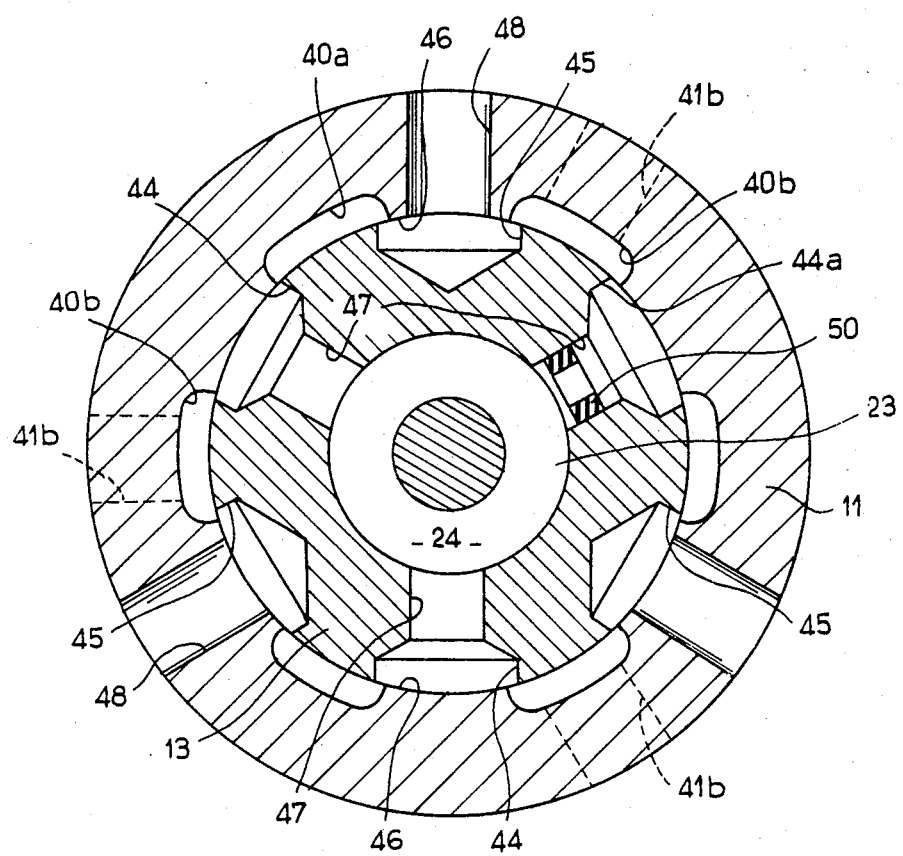
FIG. 2 is a section II—II of the distributor elements of the device in FIG. 1.
Figure 3:
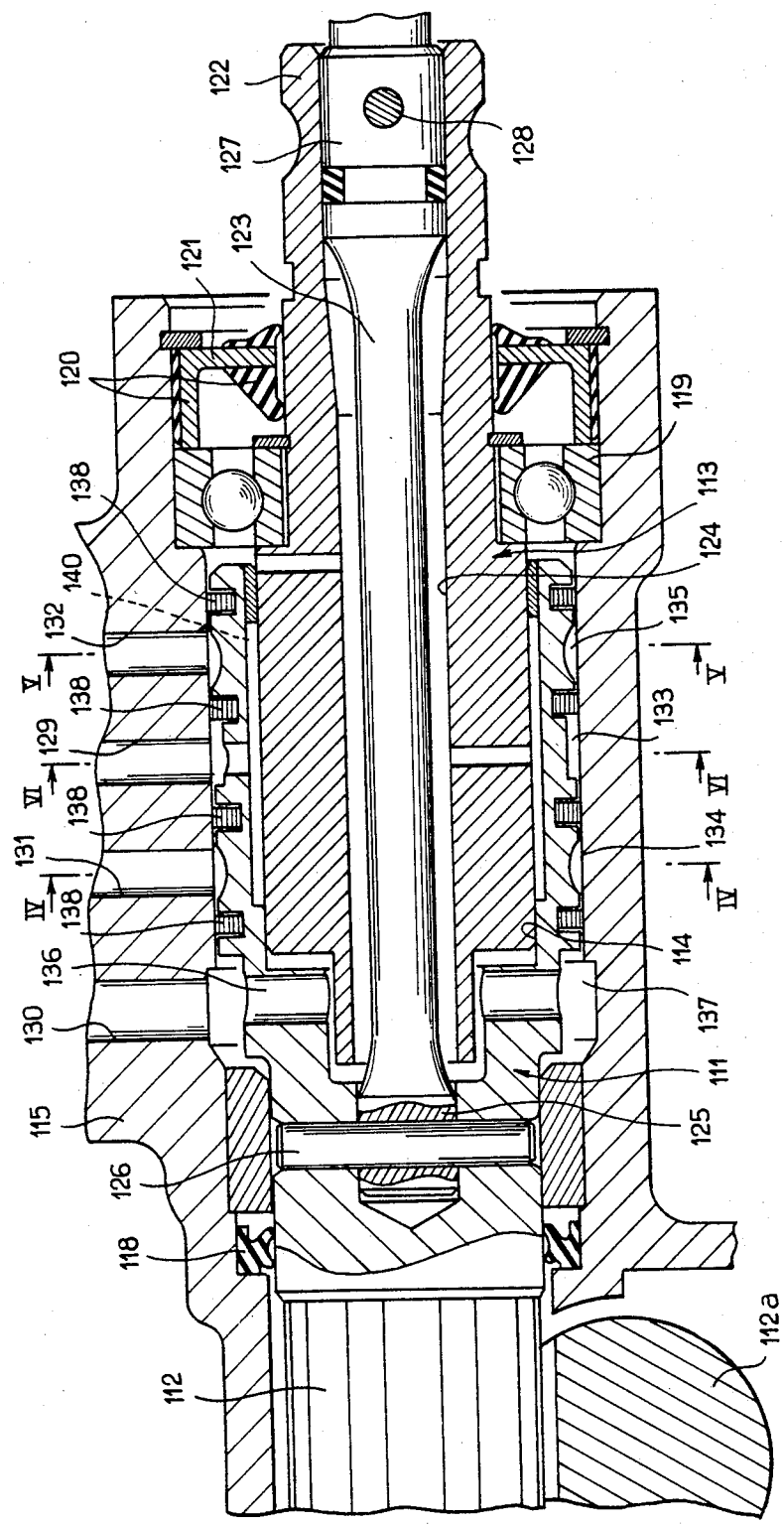
FIG. 3 is a partial sectional view of another embodiment of a distributor conforming to the invention.

The device shown in FIGS. 1 and 2 comprises an outer distributor element 11, of cylindrical shape, which terminates in a gear portion 12 meshing with the rack 12a of the steering system of a motor vehicle, and an inner distributor element 13, a cylindrical portion of which is mounted rotatably in an axial bore 14 of the distributor element 11. The latter is itself rotatably mounted in a stationary casing 15 formed in one piece with the casing for the rack 12a. An annular seal 18 marks the separation between the distributor housing and the rack housing. A ball bearing 19 is interposed between the outer surface of the distributor element 13 and the inner surface of the casing 15. Its two cages interact respectively with shoulders in said casing and in said inner distributor element so as to define the axial position of the latter. A seal 20, reinforced by an annular metal cup 21, is also mounted between the inner surface of the casing 15 and the outer surface of the inner distributor element 13 in such a way that the end portion 22 of the latter projects beyond the opening in the casing 15. The end portion 22 is intended to be connected to the steering column of the vehicle. A torsion bar 23 is housed inside an axial cavity 24 in the inner distributor element 13. This torsion bar is connected at one end 25 to the outer distributor element 11, by means of a pin 26, and at its other end 27 it is connected to the distributor element 13 by means of a pin 28. The rest position of the torsion bar 23 defines a relative neutral position between the two distributor elements 11 and 13. The casing 15 is provided with a port 29 for connection to a fluid source (a pump, not shown), a port 30 for connection to a fluid reservoir, and two ports 31, 32 for connection to a cylinder. The port 29 communicates with an annular passage 33 defined between the outer surface of the distributor element 11 and the cylindrical inner surface of the casing 15, whereas connection ports 31 and 32 communicate with annular spaces 34 and 35, respectively, defined in the same way on either side of the annular space 33. The connection port 30 communicates with the axial cavity 24 via an annular passage 37 defined between the casing and the distributor element 11, and via holes 36 arranged radially in the latter. The connection ports 29, 30, 31 and 32 respectively constitute the inlets and outlets of a fluid circulation circuit consisting of openings and cavities defined in the distributor elements 11 and 13. Annular seals 38 mounted on the outer surface of the outer distributor element 11 ensure separation without leakage between the annular passages 33, 34, 35 and 37. This circuit consists of passages of variable section defined by the cylindrical contact surfaces of the distributor elements 11 and 13. In the embodiment of FIG. 2, these passages of variable section consist of:

six longitudinal grooves 40a, 40b, which are closed at their axial ends and spaced evenly around the inner surface (that is to say along the axial bore 14) of the outer distributor element 11, and holes 44, 45 arranged radially at regular intervals in the inner distributor element 13 and positioned facing smooth inner areas 46 of the outer distributor element 11 between the adjacent edges of two neighbouring grooves 40, when in the neutral position shown. There are three blind holes 45 whereas the three holes 44 are radially extended into the axial cavity 24 by drain holes 47. The holes 44 and 45 are alternated in a regular manner on the surface of the distributor element 13 and their axes are co-planar, substantially facing the annular passage 33. The blind holes 45 face smooth areas 46 where corresponding radial orifices 48 emerge, which communicate with the annular passage 33, that is to say with the means for connection to the afore-mentioned fluid source. The grooves 40a and 40b are also alternated circumferentially and are in communication with the annular passages 34 and 35 respectively, via respective holes 41a and 41b arranged radially in the outer distributor element 11, facing these annular passages.

According to another important feature of the invention, at least the holes 44 have different diameters so as to define passages which close in succession as a function of the relative rotation in a given direction of one distributor element with respect to the other. In fact, it is the closure of the passages of variable section defined by the interaction of these holes 44 and of the neighbouring grooves 40 which establishes the characteristic of the distributor. In addition, an anti-cavitation flow restriction can be advantageously arranged in the flow path between the opening of the hole 44a of largest diameter situated in the region of the cylindrical contact surfaces of the two distributor elements, and the means for connection to the reservoir, in particular the axial cavity 24. This flow restriction can be embodied, for example, as a ring 50 pressed into the passage 47 which extends radially inwardly the hole 44a. This flow restriction provides means for countering effectively the noise resulting from cavitation phenomena which could arise at high working pressures.

The operation of the device is conventional. In the neutral position shown, the fluid introduced through the three inlet orifices 48 flows into the corresponding blind holes 45 and divides equally between the grooves 40a and 40b before being drained through the holes 44, the drain holes 47 and the axial cavity 24 leading to the reservoir (not shown) connected to the outlet port 30 in the casing. If the user imparts a slight rotation to the inner distributor element 13, against the reaction force exerted by the torsion bar, the angular displacement causes a restriction of the passage section between the grooves 40a and the holes 44 on the one hand, and the grooves 40b and the holes 45 on the other. From this, a rapid rise in pressure follows in these grooves which is transmitted to one of the chambers of the assistance cylinder of the power-assisted steering installation.

FIGS. 3 to 6 illustrate a second embodiment of a distributor conforming to the invention. In these figures, similar constructive or operative elements are given the same reference numbers increased by 100. This embodiment differs from the preceeding in that the holes arranged in the inner distributor element are all blind and are divided into two groups $G_1$ and $G_2$ offset axially on the surface of the inner distributor element 113, the axes of the blind holes in each group being situated in the same plane facing the annular passages 134 and 135, respectively. The blind holes in group $G_1$ are shown in FIG. 4, whereas those in group $G_2$ are shown in FIG. 5. In the illustrated embodiment, of the six blind holes in group $G_1$, three holes 151a, spaced at 120° to each other, face smooth areas of the inner surface of the outer distributor element 111 where radial orifices 152a emerge, each communicating outwardly with the annular passage 134. The three other blind holes 153a in group $G_1$, also spaced at 120° to each other, are simply positioned facing the other smooth areas of the outer distributor element 111 delimitated by two adjacent longitudinal grooves 160a and 160b. In the same way, three blind holes 151b in group $G_2$, spaced at 120° to each other, face smooth areas of the outr distributor element 111 where radial orifices 152b emerge, communicating outwardly with the annular space 135. The blind holes 151b of group $G_2$ are spaced at 60° relative to the corresponding blind holes 151a of group $G_1$. Three other blind holes 153b in group $G_2$, spaced at 120° to each other, regulate the communication between two neighbouring longitudinal grooves 160a, 160b respectively in the outer distributor element 111. As FIG. 6 shows, the longitudinal grooves 160a communicate with the annular space 133 by means of holes 161 arranged radially in the outer distributor element 113 and emerging into the axial cavity 124 inside the latter. Thus the grooves 160a communicate with the fluid source connected to the inlet port 129 while the longitudinal grooves 160b communicate with the fluid reservoir (not shown) via the drain holes 147, the cavity 124, the holes 136, the annular passage 137 and the outlet port 130.

The operation is exactly the same as before, although the functions of the longitudinal grooves and the holes are interchanged.

Of course, at least the blind holes 151 of each group $G_1$ and $G_2$ have different diameters to establish the desired characteristic of the distributor. A flow restriction may also be provided in the drain holes 147 which communicate with the longitudinal groove 160b situated between the two blind holes 151a, 151b of largest diameter.

In the two embodiments described above, the desired characteristic of the distributor may be obtained with holes of the same diameter but with longitudinal grooves of different widths. That is to say that the invention covers all the technical equivalents of the means employed, provided they are within the scope of the following claims.

I claim:

1. A rotary hydraulic distributor for a servo-mechanism, especially for the assisted steering system of a motor vehicle, of the type comprising two distributor elements provided with co-axial cylindrical portions, respectively an outer distributor element having a cylindrical inner surface and an inner distributor element having a cylindrical outer surface and rotatably mounted in an axial bore of said outer distributor element forming said inner surface and capable of a limited relative rotation with respect to the latter, to and fro about a relative neutral position, wherein said distributor elements are provided with cavities which define a fluid circulation circuit connectable to a fluid source and a fluid reservoir and selectively to at least one chamber of an assistance cylinder, said fluid circulation circuit including variable restrictions defined by cooperating portions of said cavities opening in said inner and outer surfaces of said distributor elements, respectively, and variable as a result of a relative rotation between said distributor elements, characterized in that said cooperating portions of said cavities consist of:

an even number of evenly angularly spaced axially extending grooves closed at their axial ends formed in said inner surface of said outer distributor element, and radially extending bores formed at regular angular intervals in said outer surface of said inner distributor element and positioned facing smooth inner areas of said inner surface of said outer distributor element between adjacent edges of two neighboring grooves thereof, when said distributor is in said neutral position.

2. The distributor in accordance with claim 1, characterized in that half of said bores are blind, and the other half of the bores extend radially into an axial cavity formed centrally in said inner distributor element which communicates with means for connection to said fluid reservoir, and in that said blind bores are positioned facing smooth areas of the inner surface of the outer distributor element where radial orifices open which communicate outwards with means for connection to said fluid source.

3. The distributor in accordance with claim 1, characterized in that said bores are all blind and are divided into two groups offset axially on the outer surface of said inner distributor element.

4. The distributor in accordance with claim 3, characterized in that some of said blind bores in each group face smooth areas on the inner surface of said outer distributor element where radial orifices open to communicate outwards with means for connection to one chamber of said assistance cylinder, respectively for each group, and in that said grooves are alternately connected to means for connection to said fluid source and to means for connection to said fluid reservoir.

5. The distributor in accordance with claim 4, characterized in that said grooves, connected to said means for connection to said reservoir, are positioned facing drain bores formed radially in said inner distributor element and opening inwardly into an axial cavity in the inner distributor element, said cavity communicating with said means for connection to said fluid reservoir.

6. The distributor in accordance with claim 2 or 3, characterized in that said bores have different diameters which define passages closing in succession as a function of said relative rotation in a given direction.

7. The distributor in accordance with claim 2, characterized in that said bores have different diameters and in that an anti-cavitation flow restriction is arranged in the flow path, or in each flow path, provided between the opening of the bore or of each bore of largest diameter in the adjacent outer surface of said inner distributor element and said means for connection to said reservoir.

* * * * *